P. CAMMANS.
SUBMERSIBLE COOKER.
APPLICATION FILED OCT. 14, 1919.
1,362,224.
Patented Dec. 14, 1920.
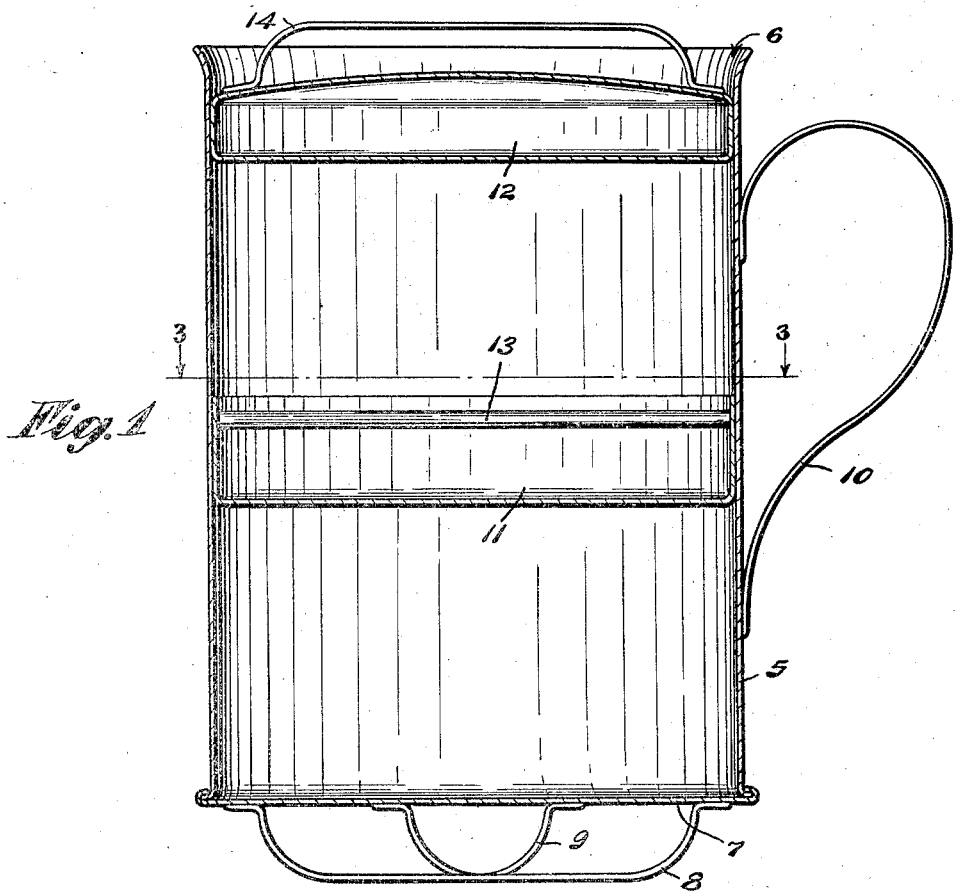
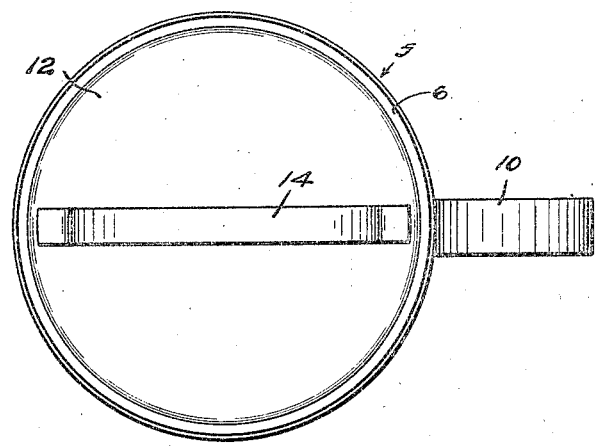
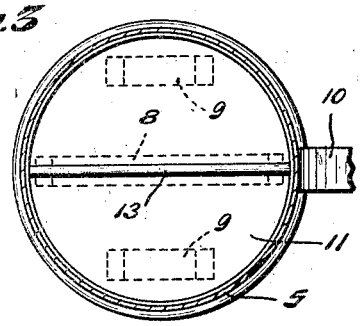
INVENTOR
Paul Cammans.
BY
Frank Warren
ATTORNEY

UNITED STATES PATENT OFFICE.

PAUL CAMMANS, OF SEATTLE, WASHINGTON.

SUBMERSIBLE COOKER.

1,362,224.   Specification of Letters Patent.   Patented Dec. 14, 1920.

Application filed October 14, 1919. Serial No. 330,617.

*To all whom it may concern:*

Be it known that I, PAUL CAMMANS, a subject of the Queen of the Netherlands, residing at Seattle, in the county of King and State of Washington, have invented a certain new and useful Improvement in Submersible Cookers, of which the following is a specification.

My invention relates to improvements in submersible cookers and is an improvement on the cookers shown and described in my prior United States Letters Patents No. 1,317,071 and No. 1,331,620 issued September 23, 1919, and February 24, 1920, respectively.

The object of my invention is to provide a submersible cooker embodying a receptacle provided with a plurality of closely fitting longitudinally movable partitions that may be adjusted to afford cooking compartments of various sizes and that will be moved automatically to vary the size of the cooking compartments when used for cooking foods that expand.

A further object is to provide a cooker wherein the consistency of the food may be governed by varying the space of the compartment within which such food is cooked, and varying the amount of moisture that reaches such food during the cooking process.

A still further object is to provide a cooker wherein all of the various parts are provided with conveniently arranged and substantial hand holds by which they may be handled.

My invention consists in the novel construction, adaptation and combination of parts of a substantial food cooker as will be more clearly hereinafter described and claimed.

I accomplish these objects by devices illustrated in the accompanying drawings, wherein—

Figure 1 is a view in vertical mid-section of the submersible cooker constructed in accordance with my invention;

Fig. 2 is a plan view of the same; and

Fig. 3 is a view in cross-section of the same, on a reduced scale, substantially on broken line 3, 3 of Fig. 1.

Referring to the drawings, throughout which like reference numerals indicate like parts, the number 5 designates a cylindrical container that is open at one end and is provided with a flaring or bell shaped mouth 6, and that is closed at the other end by a permanent wall 7.

The wall 7 is provided with a diametrically arranged handle or hand hold 8 that is substantially flat for the greater part of the diametral distance across the receptacle and that serves as the leg or support for the receptacle when the same is in an upright position.

The end wall 7 is further provided on each side of the handle 8 with leg members 9 that coöperate with the handle 8 in supporting the receptacle in a vertical position.

The receptacle 5 is provided on one side with a conveniently arranged hand hold 10 by which it may be handled.

11 and 12 are two partition walls whose external diameter is slightly smaller than the inner diameter of receptacle 5 so that said partition walls 11 and 12 will telescope within the receptacle 5 to divide said receptacle 5 into one or more separate food compartments.

The partition wall 11 is provided with a hand hold 13 in the form of a diametrically arranged bar or rod, and the partition wall 12 is provided on its top side with a hand hold 14 by which it may be moved.

In use when only one kind of food is to be cooked only one of the partition walls 11 and 12 is used, the food being placed in the receptacle 5 together with the necessary amount of water and the partition wall being inserted in the open end of the receptacle and moved inwardly until the food is confined in as small a space as desired. The cooker may then be submerged in boiling water and allowed to remain there until the food is cooked.

If the food is of an expansible nature the expansion thereof will move the slidable partition outwardly thereby automatically forming a compartment just large enough to contain the food.

In cooking foods in cookers of this class, it is desirable that the food and the water in which it is cooked shall fill the entire compartment in which it is cooked and that there shall be no excess air spaces. My cooker makes it possible to cook any desired amount of food in a closed container by varying the size of the container.

The consistency or thickness of cooked food depends principally on the amount of moisture in such food and my apparatus makes it possible to regulate the amount of such moisture by regulating the size of the compartment in which the food is cooked without allowing any excess air space in such compartment.

The evaporation takes place upon the outside of the container and does not affect the moisture within the food compartments no matter how long the food is cooked.

Obviously, changes may be made in the forms, dimensions and arrangement of parts of my invention without departing from the spirit of the invention.

What I claim:—

1. A submersible cooker comprising a cylindrical receptacle that is open at one end and closed at the other end, a hand hold on the side of said receptacle, another hand hold on the closed end of said receptacle, legs on the closed end of said receptacle, partition walls slidably disposed within said receptacle, and hand holds on said partition walls.

2. A submersible cooker comprising a cylindrical receptacle that is closed at one end that is open and slightly flared at its opposite end, a movable partition wall arranged to fit snugly within said receptacle, a handle member extending diametrically across said closed end, and legs of the same height as said handle member secured to the end of said receptacle at each side of said handle member and arranged to coöperate with said handle member to support said receptacle in an upright position.

In witness whereof, I hereunto subscribe my name this 7th day of October A. D. 1919.

PAUL CAMMANS.